United States Patent Office 3,563,778
Patented Feb. 16, 1971

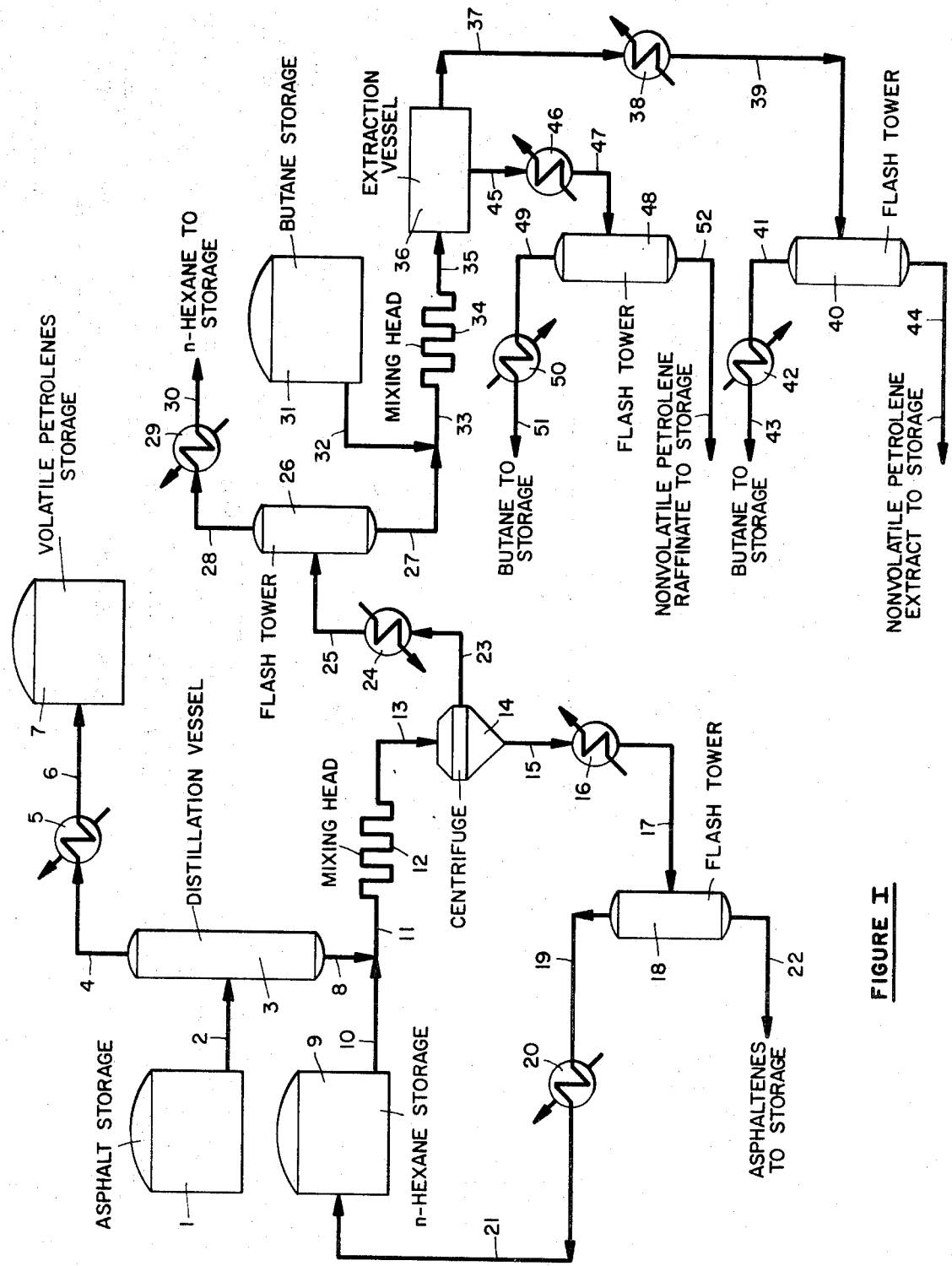
FIGURE I

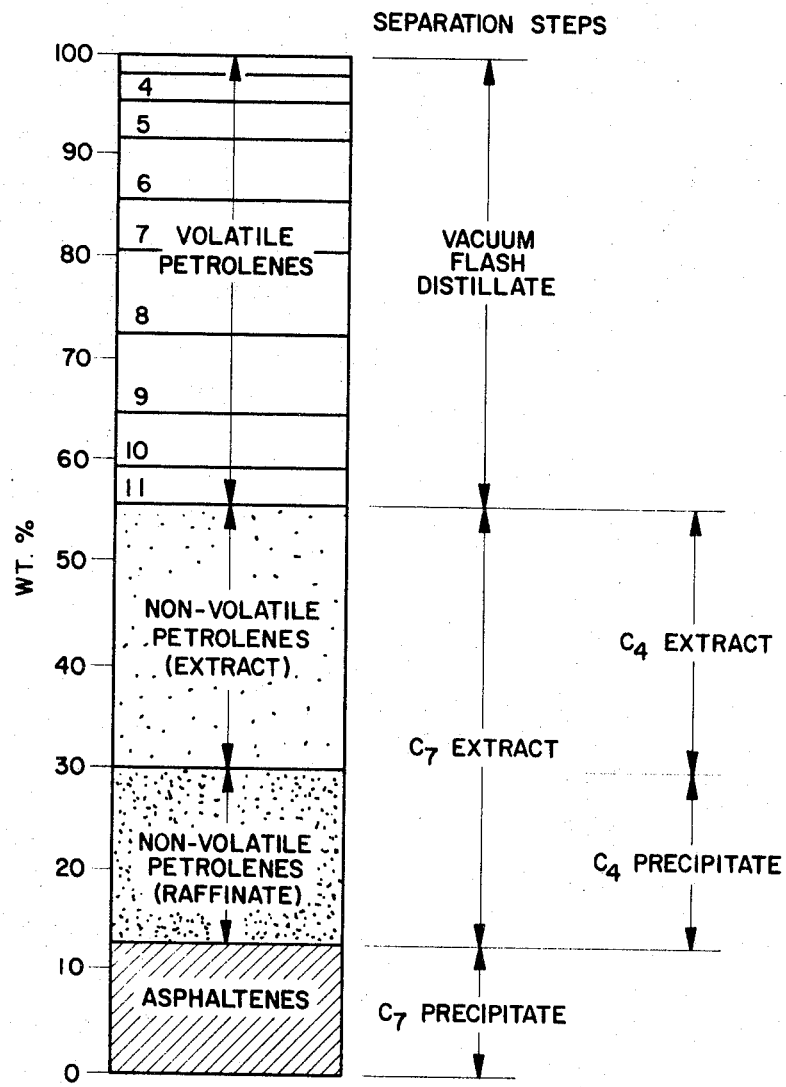
FIGURE II
FRACTIONS RECOVERED FROM ASPHALT SEPARATION

3,563,778
PREPARATION OF IMPROVED ASPHALT COMPOSITIONS
Luke W. Corbett, Mountainside, and Robert E. Swarbrick, Belle Meade, N.J., assignors to Esso Research and Engineering Company, a corporation of Delaware
Filed Feb. 14, 1966, Ser. No. 527,212
Int. Cl. C08h *13/00, 17/22;* C08j *1/46*
U.S. Cl. 106—278                              11 Claims

ABSTRACT OF THE DISCLOSURE

An asphalt separation and recombination process wherein asphaltenes are precipitated from an asphalt feed and recovered. The asphaltene-free feed is then extracted with an organic solvent to form a petrolene extract and a petrolene raffinate. The asphaltenes and petrolene extract are subsequently recombined to produce improved asphalt paving binders.

---

This invention relates to a process for the separation of asphalt into its useful components and to the utilization of such components. More particularly, it relates to a process in which asphalt is separated into various novel components which may later be combined to produce improved asphalt compositions.

In asphalt manufacture, it is common practice to subject asphalt-bearing residua to various refining operations in order to obtain asphalts having specific properties. These refining operations include straight reduction, steam distillation and vacuum flashing, all of which remove volatile oil components from the residua and produce harder asphalts of higher softening point. Another widely practiced treatment is oxidation by air blowing at elevated temperatures. Blending is also frequently done in order to control consistency, as well as to provide the desired properties necessary for meeting specifications. This may be accomplished by (a) blending residua from two or more crude sources, (b) blending of hard and soft residua to obtain intermediate consistencies, (c) blending of hard residua with less volatile cutter stocks, (d) blending of crude residua with propane precipitated asphalts and (e) combinations of the foregoing. Through these refining operations, the asphalt refiner modifies the properties of asphalts so that they will be more suitable for various uses, such as in paving, roofing materials, paper laminates, joint and crack fillers, protective coatings, briquette binders and canal membrane linings.

There has been a need for additional methods of modifying asphalt to afford the refiner greater latitude in the properties of the asphalts which can be produced. One such property which needs to be improved is resistance to hardening and subsequent cracking of asphalts on aging. The thin film hardening of asphalt binders is a quality factor which correlates with pavement cracking and eventual failure. Other properties in need of improvement, particularly for paving asphalts, are ductility, penetration, temperature susceptibility, adhesion and viscosity at elevated temperature.

It is accordingly an object of the present invention to provide a process which will afford the refiner a new and improved method of preparing asphalt to obtain improved product properties.

Another object of the present invention is to provide a process for the preparation of an asphalt having improved paving binder properties.

It is a further object of the invention to provide an asphalt composition having superior paving binder properties.

Other objects and advantages will become apparent from a reading of the following disclosure.

According to the present invention, these and other objects are achieved by a process in which asphalts are easily and efficiently separated into various components which may later be uniquely combined to yield an asphalt composition having desired properties. As is already well known, asphalt can be regarded as being composed of two general components, i.e., petrolenes and asphaltenes. The asphaltene fraction is distinguished from the petrolene fraction in that it has a higher molecular weight, a much greater consistency, and is higher in aromaticity. Both fractions are in themselves mixtures of hydrocarbons and their hetero-atom analogs. The present process comprises separating the asphalt into several distinct and novel fractions. Briefly, this process comprises separating an asphalt having an initial boiling point within the range between 600° and 1400° F. (atmospheric equivalent) into asphaltenes and petrolenes, and further separating the petrolenes into a petrolene extract and a petrolene raffinate. These separated fractions may then be recombined in a number of ways to formulate improved asphalts, e.g., it has been found that admixtures consisting essentially of asphaltenes and the aforementioned petrolene extract are improved paving binders. In general, the practice of this invention will afford a greater latitude in the ultimate properties of the asphalt which can be produced.

The aforementioned asphalt having an initial boiling point within the range between 600° and 1400° F. may be obtained by the vacuum reduction of asphalt in accordance with known techniques. Separation of the asphaltenes from the petrolenes is accomplished by contacting the asphalt with a liquid paraffin from which the asphaltenes precipitate as solids and by removing the precipitated asphaltenes by means of filtration or centrifugation. This isolated deasphaltening step is similar to that disclosed in U.S. Pat. No. 3,087,887. The separation of the petrolene extract from the petrolene raffinate is accomplished by contacting the petrolenes with an organic solvent which yields, upon settling, two distinct liquid layers, i.e., a light layer containing the petrolene extract and a heavy layer containing the petrolene raffinate and by separately withdrawing each layer. The solvent employed may then be distilled off to isolate the products.

The invention will be more fully understood by referring to the accompanying drawings in which:

FIG. 1 shows a flow diagram for one embodiment of the same;

FIG. 2 shows the yields obtained when an asphalt is separated into its useful components in accordance with this invention.

The present invention contemplates the employment of any asphalt comprising petrolenes and asphaltenes. Preferred, however, are those asphalts which contain more than about 2 wt. percent asphaltenes. Use of asphalt containing less than the preferred amount of asphaltenes will tend to result in an excessive amount of asphalt being processed in order to obtain a given amount of asphaltenes. Nonlimiting examples of asphalts which may be employed are residua, straight reduced asphalts, air blown asphalts and blended asphalts. The foregoing asphalts may be, for example, derived from Lagunillas, Boscan, Aramco, Talco, Kuwait, Oregon Basin, Lloydminister, Santa Maria, Kern River, and Eucutta crudes and the like.

The precipitant used to separate asphaltenes from the petrolenes includes any liquid paraffin or mixtures thereof which, when contacted with a petroleum fraction containing asphaltenes, causes said asphaltenes to precipitate as solids. Such precipitants are known in the art, e.g., U.S. Pat. 3,087,887, which is incorporated herein by reference. Such precipitants include the $C_5$–$C_{12}$ paraffins, preferably the $C_5$–$C_9$ normal paraffins. Nonlimiting examples of suitable precipitants are n-pentane, hexane, n-heptane, nonane, dodecane and the like.

The orgnaic solvent used to separate the petrolenes into a petrolene extract and a petrolene raffinate includes any organic solvent which, when contacted with petrolenes, yields two distinct liquid layers, i.e., a less dense extract layer which contains the lower molecular weight, less polar petrolenes and a more dense raffinate layer which contains the higher molecular weight petrolenes, i.e., those having a molecular weight essentially greater than about 1,000. In general, suitable solvents comprise the lower boiling $C_2$ to $C_5$ saturated acyclic organic compounds in an amount sufficient to form a petrolene extract and a petrolene raffinate. A preferred class of solvents comprises a solvent containing a major amount (more preferably an amount in excess of about 80%) of a compound selected from the group consisting of a $C_3$ to $C_4$ paraffin, a $C_2$ to $C_5$ ester, a $C_3$ to $C_5$ ketone, a $C_2$ to $C_5$ ether and mixtures thereof. As indicated, the aforedescribed solvents may contain minor amounts of other materials, e.g., the higher paraffins, alcohols, aldehydes, amines, unsaturates, nitro-compounds, chlorides and the like. Nonlimiting examples of operable solvents are propane, butane, acetone, methyl ethyl ketone, diethyl ketone, methyl acetate, n-butanol, ethyl acetate, nitro methane, isopropyl ether, tert. butyl methyl ether, allyl methyl ether, isopropyl acetate, n-propyl acetate, methyl propionate, ethyl propionate and propyl propionate and mixtures thereof.

The asphalt is fed into the distillation zone where the lower boiling petrolenes are separated from the asphaltenes and the higher boiling petrolenes by conventional distillation methods. The temperature and pressure employed will depend upon the particular feed which is to be fractionated. In general, asphalt having higher boiling points will require lower distillation pressures and/or higher distillation temperatures. Broadly, a distillation bottoms temperature of about 600° to about 825° F. and a pressure less than atmospheric is used. It is preferred, however, that the temperature be from about 700° to about 800° F. and the pressure be from about 1 mm. Hg to about 60 mm. Hg. Temperatures in excess of 850° F. should be avoided for any prolonged time in order to minimize any possible thermal degradation of the asphalt. The temperature, pressure and time in the distillation zone should be adjusted so that the atmospheric initial boiling point of the residual asphalt comprising asphaltenes and petrolenes will be within the range between about 600° and 1400° F. If desired, the overhead petrolene fraction, i.e., the volatile petrolenes can be further separated into several fractions in order to permit greater latitude in the subsequent blending of these petrolenes. Vacuum fractionation of the asphalt feed can be effected in conventional distillation units, e.g. vacuum pipestills, or packed or plate distillation columns.

The nonvolatile fraction recovered as bottoms from the distillation zone is contacted with a liquid paraffin into which asphaltenes precipitate as solids. The temperatures and pressures used in thois contacting may vary widely. It has been found that this precipitation can be conveniently effected at a temperature of from about 50° to about 200° F., preferably between about 70° and 125° F. and at atmospheric pressure. Contact time is not critical since upon contact of the nonvolatile fraction with the liquid paraffin, precipitation of the asphaltenes is very rapid. The precipitated asphaltenes are then subsequently removed from the petrolenes by filtration or by centrifugation, preferably the latter. A centrifuge suitable for this purpose is a Sharples Nozzlejector type DH–2 which is capable of handling up to 3,000 gallons per hour of charge.

The petrolenes are separated as hereinbefore described by contacting them with an organic solvent which yields an extract fraction and a raffinate fraction in the extraction zone. The temperature employed for the separation may be from about 100° to about 250° F., preferably from about 120° to about 200° F. The pressure used must be such that the organic solvent is liquid in the extraction zone, e.g., solvents such as propane and butane will require superatmospheric pressure while solvents such as acetone may be used at atmospheric pressure. Agitation may be employed in order to afford more efficient contact.

Turning now to FIG. 1 which illustrates a preferred embodiment of this invention, a Lagunillas, Venezuelan straight reduced residuum having a softening point of 84° F. is used as the feed in the specific embodiment to be described hereinafter. The feed kept in storage 1 is pumped through line 2 into distillation vessel 3 which may be a vacuum pipestill. The temperature and pressure employed are approximately 700° F. and 5 mm. Hg respectively. The low boiling material, i.e., the volatile petrolenes, is taken off overhead through line 4 and condensed in condenser 5 at about 150° F. and sent to storage vessel 7 by means of line 6. These volatile petrolenes may then be blended with other asphalt fractions either as recovered from condenser 5, or they may be further separated by distillation into several volatile petrolene fractions. The nonvolatile fraction from distillation vessel 3, i.e., a mixture of asphaltenes and petrolenes having an initial boiling point within the range between 600° and 1400° F., is withdrawn through line 8 while normal hexane in an amount sufficient to precipitate the asphaltenes is pumped from storage 9 through line 10 into line 11. The mixing ratio is preferably 12/1 normal hexane/nonvolatile fraction by volume, although this may vary, for example, from about 4/1 to about 50/1. Other liquid paraffins as hereinbefore mentioned may be used in place of the normal hexane. As soon as the nonvolatile fraction from distillation 3 is contacted with the liquid paraffin, the asphaltenes are deflocculated, that is, the asphaltene-oil phase colloid is broken as the result of dilution of the soluble petrolene phase. The mixture then passes through a mixing head 12 or some other suitable mixing device and thence by line 13 into a continuous type high speed centrifuge 14 wherein the solid asphaltenes are separated from the soluble petrolenes. The asphaltene-hexane slurry from the centrifuge 14 is then continuously pumped through line 15 into heat exchanger 16 and thence by line 17 to flash tower 18 for stripping. Hexane is taken overhead through line 19, condensed in condenser 20, and sent by line 21 to storage 9 for reuse. The bottoms from flash tower 18, i.e., the asphaltenes, are withdrawn through line 22 and sent to storage. The nonvolatile petrolenes from centrifuge 14 are withdrawn through line 23, passed through heat exchanger 24 and thence sent to flash tower 26 by means of line 25. Hexane from flash tower 26 is taken overhead through line 28, condensed in condenser 29, and sent by line 30 to storage. The bottoms from flash tower 26, i.e. the petrolenes, are withdrawn through line 27 while butane in an amount sufficient to form a petrolene extract and a petrolene raffinate is pumped from storage 31 through line 32 into contact and admixture with the petrolenes in line 33. Other solvents, as hereinbefore mentioned may be used in place of butane. The solvent/petrolene volume ratio may vary widely, e.g., from about 2/1 to about 15/1, preferably from about 3/1 to about 5/1. The solvent-petrolene admixture then passes through a mixing head 34 or some other suitable mixing device and thence by means of line 35 into extraction vessel 36 wherein petrolenes separate into an extract phase and a raffinate phase. Extraction may be carried out in a battery of extraction vessels or in one continuous extraction vessel. The petrolene extract phase is withdrawn through line 37, passed through heat exhanger 38, and thence, via line 39, into flash tower 40 for stripping. Butane is taken overhead through line 41, condensed in condenser 42 and sent, by means of line 43, to storage or immediately recirculated. The petrolene extract is withdrawn from flash tower 40 through line 44 and sent to storage. The petrolene raffinate from extraction vessel 36 is passed through line 45 into heat exchanger 46 and then into flash tower 48 by means of line 47, wherein the organic solvent is stripped off. The organic solvent is taken overhead through line 49, condensed in condenser 50, and thence, via line 51, sent to storage. The petrolene raffinate is withdrawn through line 52 and sent to storage. The various recovered fractions from the foregoing process may then be advantageously combined in varied amounts to produce a reconstituted asphalt having desired properties.

The process of the instant invention contemplates the admixture of asphaltenes and petrolene extract to yield asphalt compositions comprising from about 5 to about 50 wt. percent asphaltenes and from about 50 to about 95 wt. percent of the petrolene extract.

It has been found, for example, that asphalt paving binders consisting essentially of from about 5 to about 35 wt. percent asphaltenes and from about 65 to about 95 wt. percent of the petrolene extract have superior properties as hereinafter described in Example III. A particularly effective paving binder consists essentially of from about 15 to about 25 wt. percent asphaltenes and from about 75 to about 85 wt. percent of the petrolene extract. In general, within the foregoing composition range, a high asphaltene content will yield an asphalt binder having a relatively low penetration and a high viscosity, while, conversely, a low asphaltene content will result in an asphalt binder having a relatively high penetration and a low viscosity. All of the aforementioned asphalt binders, however, exhibit a similarly high degree of resistance to hardening and aging.

The invention can be more fully understood by reference to the following examples:

EXAMPLE 1

A 900 lb. sample of Lagunillas, Venezuelan straight reduced residuum of 84° F. softening point was fractionated according to the process illustrated in FIG. 1. The yields (wt. percent basis) obtained (as shown in FIG. 2) were recovered by the following procedure: Distillation was first accomplished by vacuum pipestill reducing the residuum into a 1150° F. minus (atmospheric equivalent) overhead fraction (i.e., the volatile petrolenes) and a 1150° F. plus bottoms (i.e., asphaltenes and nonvolatile petrolenes). The temperature and pressure employed were approximately 700° F. and 5 mm. Hg. The overhead was then redistilled by means of a single plate high vacuum still separating 50° F. cut point fractions. This distillation yielded 11 volatile petrolene fractions. Deasphalting of the 1150° F. plus fraction was accomplished by treatment with n-heptane at a 12/1 n-hexane/oil volume ratio followed by centrifuge separation into asphaltenes and nonvolatile petrolenes. Separation of the nonvolatile petrolenes was accomplished by extraction with butane at a butane/nonvolatile petrolene ratio of 5/1. The petrolene/butane mixture was mixed at 150°–170° F. for about one hour, followed by a two-hour settling period, after which two distinct phases, i.e., an extract and a raffinate, were recovered. The petrolene raffinate had a numbers average molecular weight of about 1,470 as measured by vapor pressure osmometry.

EXAMPLE 2

That extraction with acetone and the like may be used in place of extraction with butane is shown by the following data. A 100 gram sample of nonvolatile petrolenes from Example 1 was contacted with acetone at a 6/1 acetone/nonvolatile petrolene volume ratio. The petrolene-acetone mixture was mixed at 120° to 140° F. for about two hours and allowed to settle for about one hour. As in Example 1, a petrolene extract and a petrolene raffinate were recovered. The raffinate recovered by means of this acetone extraction is, as shown in Table I, comparable to the raffinate recovered by means of butane extraction.

TABLE I

| Raffinate from treatment with | Butane | Acetone |
|---|---|---|
| Yield, wt., percent | 34.4 | 30.6 |
| Product softening point, ° F.[1] | 214 | 199 |
| Densimetric analysis [2] density 20/4° | 1.063 | 1.025 |

[1] ASTM D-36-62T.
[2] Analytical Chemistry 36, 1967 (1964).

EXAMPLE 3

The asphaltenes and petrolene extract of Example 1 were admixed to yield the asphalt products shown in Table II. These reconstituted asphalts were compared to asphalts produced from the same residuum but by different processes, i.e., straight reduction and air blowing of the residuum. The results given in Table II show that admixtures of asphaltenes and the petrolene extract have superior asphalt paving binder properties, i.e., good ductility (ductility at 77° F.) together with higher viscosity at elevated temperatures (Furol viscosity at 275° F.) and greater resistance to hardening and aging (TFR., percent orig. pen.).

TABLE II.—COMPARATIVE PHYSICAL PROPERTIES OF ASPHALT PAVING BINDERS

| | | | | Asphalt paving binders | | |
| | | | | | Reconstituted asphalt | | |
| Property | ASTM method | Straight reduced | Air blown | (1) | (2) | (3) |
|---|---|---|---|---|---|---|
| Penetration at 77° F., cm | D-5-61 | 90 | 90 | 40 | 90 | 200 |
| Ductility at 77° F., cm | D-113-44 | 100+ | 100+ | 100+ | 100+ | 100+ |
| Furol viscosity at 275° F. | D-88-56 | 178 | 188 | 413 | 280 | 205 |
| Thin film oven loss, wt., percent | D-1754-63T | 0.0 | 0.2 | 0.0 | 0.0 | 0.0 |
| Thin film residue, percent original penetration | D-1754-63T | 64 | 66 | 75 | 74 | 71 |

[1] Composition is 28 wt. percent asphaltenes and 72 wt. percent petrolene extract.
[2] Composition is 13 wt. percent asphaltenes and 87 wt. percent petrolene extract.
[3] Composition is 7 wt. percent asphaltenes and 93 wt. percent petrolene extract.

EXAMPLE 4

The process of Example 1 is repeated except that the solvent employed in the petrolene extraction operation is acetone. The asphaltenes and the petrolene extract are recovered and admixed to yield a composition containing 22 wt. percent asphaltenes and 78 wt. percent petrolene extract. The resulting product is found to be an effective asphalt paving binder.

EXAMPLE 5

The process of Example 1 is repeated except that the solvent employed in the petrolene extraction operation is ethyl acetate. The asphaltenes and the petrolene extract are recovered and admixed to yield a composition containing 22 wt. percent asphaltenes and 78 wt. percent petrolene extract. The resulting product is found to be an effective asphalt paving binder.

EXAMPLE 6

The process of Example 1 is repeated except that the solvent employed in the petrolene extraction operation is tert. butyl methyl ether. The asphaltenes and the petrolene extract are recovered and admixed to yield a composition containing 22 wt. percent asphaltenes and 78 wt. percent petrolene extract. The resulting product is found to be an effective asphalt paving binder.

It is not intended to restrict the present invention to the foregoing examples, but rather it should be only limited by the appended claims.

What is claimed is:

1. A process for the separation of asphalt into its useful components which comprises contacting an asphalt comprised of asphaltenes and petrolenes and having an initial boiling point within the range between about 600° and 1400° F. with a liquid paraffin in an amount sufficient to precipitate the asphaltenes and form an asphaltene fraction and a petrolene fraction, separating said asphaltene fraction from said petrolene fraction, contacting said petrolene fraction with an organic solvent in an amount sufficient to form a petrolene extract and a petrolene raffinate, said solvent being comprised of a compound selected from the group consisting of a $C_3$–$C_4$ paraffin, a $C_2$–$C_5$ ester, a $C_3$–$C_5$ ketone, a $C_2$–$C_5$ ether and mixtures thereof, and separating said petrolene extract from said petrolene raffinate.

2. A process according to claim 1 wherein the said solvent is an acetone-containing solvent.

3. A process according to claim 1 wherein the said solvent is a butane-containing solvent.

4. A process according to claim 1 wherein the said solvent is a propane-containing solvent.

5. A process according to claim 1 wherein said asphaltenes and said petrolene extract are subsequently admixed to yield an asphalt product consisting essentially of from about 5 to about 50 wt. percent of said asphaltenes and from about 50 to about 95 wt. percent of said petrolene extract.

6. The product consisting essentially of from about 5 to about 50 wt. percent asphaltenes and from about 50 to about 95 wt. percent of a petrolene extract, said petrolene extract being prepared by contacting an asphaltene-free asphalt having an initial boiling point within the range between about 600° and 1400° F. with an organic solvent comprised of a compound selected from the group consisting of a $C_3$–$C_4$ paraffin, a $C_2$–$C_5$ ester, a $C_3$–$C_5$ ketone, a $C_2$–$C_5$ ether and mixtures thereof, separating said contacted asphalt into a petrolene extract and a petrolene raffinate and recovering said petrolene extract.

7. A product according to claim 6 wherein the said solvent is an acetone-containing solvent.

8. A product according to claim 6 wherein the said solvent is a propane-containing solvent.

9. A product according to claim 6 wherein the said solvent is butane-containing solvent.

10. A process according to claim 1 wherein said solvent is acetone and/or a hydrocarbon consisting of a $C_3$–$C_4$ paraffin.

11. A product according to claim 6 wherein said solvent is acetone and/or a hydrocarbon consisting of a $C_3$–$C_4$ paraffin.

References Cited

UNITED STATES PATENTS

| | | | |
|---|---|---|---|
| 2,894,904 | 7/1959 | Hardman et al. | 106—278X |
| 2,913,389 | 11/1959 | Heithaus, Jr. | 208—23 |
| 3,072,559 | 1/1963 | Corbett | 208—45 |
| 3,087,887 | 4/1963 | Corbett et al. | 208—45 |
| 3,093,573 | 6/1963 | Corbett | 208—23X |
| 3,303,122 | 2/1967 | Doelman | 208—45 |
| 3,360,455 | 12/1967 | Corbett et al. | 208—22 |

OTHER REFERENCES

Abraham, Asphalts and Allied Substances, vol. I, New York, D. Van Nostrand Company, Inc. 1960; pp. 123–126.

Abraham, Asphalts and Allied Substances, vol. II, New York, D. Van Nostrand Company, Inc. 1960; pp. 201–203.

JULIUS FROME, Primary Examiner

J. B. EVANS, Assistant Examiner

U.S. Cl. X.R.

106—279; 208—8, 23, 45